(12) United States Patent
Wakayama (10) Patent No.: US 11,598,713 B2
(45) Date of Patent: Mar. 7, 2023

(54) PARTICLE SIZE MEASUREMENT METHOD, PARTICLE SIZE MEASUREMENT APPARATUS, AND PARTICLE SIZE MEASUREMENT PROGRAM

(71) Applicant: Otsuka Electronics Co., Ltd., Osaka (JP)

(72) Inventor: Ikuo Wakayama, Hirakata (JP)

(73) Assignee: OTSUKA ELECTRONICS CO., LTD., Osaka (JP)

( * ) Notice: Subject to any disclaimer, the term of this patent is extended or adjusted under 35 U.S.C. 154(b) by 56 days.

(21) Appl. No.: 17/220,936

(22) Filed: Apr. 2, 2021

(65) Prior Publication Data

US 2021/0310929 A1    Oct. 7, 2021

(30) Foreign Application Priority Data

Apr. 6, 2020    (JP) .............................. JP2020-068347

(51) Int. Cl.
*G01N 15/14*    (2006.01)

(52) U.S. Cl.
CPC .  *G01N 15/1429* (2013.01); *G01N 2015/1493* (2013.01)

(58) Field of Classification Search
CPC ....... G01N 15/1429; G01N 2015/1493; G01N 15/0211; G01N 2015/0222; G01J 1/02
See application file for complete search history.

(56) References Cited

U.S. PATENT DOCUMENTS

| 5,015,094 A | * | 5/1991 | Oka | ................... G01N 15/0205 356/336 |
| 2003/0133110 A1 | | 7/2003 | Tsutsui et al. | |
| 2013/0215424 A1 | * | 8/2013 | Hanlon | .............. G01N 15/1429 356/337 |

(Continued)

FOREIGN PATENT DOCUMENTS

| EP | 3203210 A1 | 8/2017 |
| JP | S63265138 A | 11/1988 |

(Continued)

OTHER PUBLICATIONS

Search Report dated Sep. 7, 2021, for corresponding EP Patent Application No. 21166908.0 pp. 1-11.

*Primary Examiner* — Roy M Punnoose
(74) *Attorney, Agent, or Firm* — HEA Law PLLC (57) ABSTRACT

Provided are a particle size measurement method, a particle size measurement apparatus, and a particle size measurement program in which a needless measurement time period is omitted by setting an appropriate measurement time period in accordance with a particle size to be measured. The particle size measurement method includes: a test measurement step; an autocorrelation function calculation step; a setting step of setting a part of a plurality of measurement timings set in advance as measurement timings to be used for main measurement, based on a time period required until an autocorrelation function falls below a predetermined threshold value and a preliminary time period set and added to the time period; a main measurement step of measuring a main measurement intensity of scattered light during a main measurement time period; and a particle size calculation step of calculating a particle size of a sample.

6 Claims, 9 Drawing Sheets

(56) References Cited

U.S. PATENT DOCUMENTS

| | | | |
|---|---|---|---|
| 2015/0369732 A1* | 12/2015 | Hanlon | G01N 15/0211 356/338 |
| 2016/0202164 A1 | 7/2016 | Trainer | |
| 2019/0323937 A1* | 10/2019 | Hbel | G01N 15/0227 |

FOREIGN PATENT DOCUMENTS

| | | |
|---|---|---|
| JP | 2001074642 A | 3/2001 |
| JP | 2002296118 A | 10/2002 |

* cited by examiner

CHANNEL SETTING TABLE

| GROUP | SAMPLING TIME PERIOD ($\mu s$) | START TIME LAG ($\mu s$) | END TIME LAG ($\mu s$) | CHANNEL COUNT | TOTAL CHANNEL COUNT |
|---|---|---|---|---|---|
| 1 | 0.1 | 0.1 | 5 | 50 | 50 |
| 2 | 0.2 | 5.2 | 15 | 50 | 100 |
| 3 | 0.5 | 15.5 | 40 | 50 | 150 |
| 4 | 1 | 41 | 60 | 20 | 170 |
| 5 | 2 | 62 | 100 | 20 | 190 |
| 6 | 5 | 105 | 200 | 20 | 210 |
| 7 | 10 | 210 | 400 | 20 | 230 |
| 8 | 20 | 420 | 1000 | 30 | 260 |
| 9 | 50 | 1050 | 2000 | 20 | 280 |
| 10 | 100 | 2100 | 4000 | 20 | 300 |
| 11 | 200 | 4200 | 10000 | 30 | 330 |
| 12 | 500 | 10500 | 20000 | 20 | 350 |
| 13 | 1000 | 21000 | 40000 | 20 | 370 |
| 14 | 2000 | 42000 | 100000 | 30 | 400 |
| 15 | 5000 | 105000 | 200000 | 20 | 420 |
| 16 | 10000 | 210000 | 400000 | 20 | 440 |
| 17 | 20000 | 420000 | 800000 | 20 | 460 |
| 18 | 50000 | 850000 | 1800000 | 20 | 480 |

FIRST PRELIMINARY TIME PERIOD SETTING TABLE

| NUMBER OF TIMES OF TEST MEASUREMENT | CHANGE VALUE |
|---|---|
| 1 OR LESS | 2 |
| 2 OR MORE AND LESS THAN 6 | 1 |
| 6 OR MORE | 0 |

FIG.9

SECOND PRELIMINARY TIME PERIOD SETTING TABLE

| PARTICLE SIZE CALCULATED FROM TEST MEASUREMENT INTENSITY | CHANGE VALUE |
|---|---|
| LESS THAN 100nm | 2 |
| 100nm OR MORE AND LESS THAN 1μm | 1 |
| 1μm OR MORE | 0 |

FIG.10

THIRD PRELIMINARY TIME PERIOD SETTING TABLE

| TEST MEASUREMENT INTENSITY | CHANGE VALUE |
|---|---|
| LESS THAN 1 MILLION cps | 2 |
| 1 MILLION cps OR MORE AND LESS THAN 100 MILLION cps | 1 |
| 100 MILLION cps OR MORE | 0 |

FIG.11

MAIN MEASUREMENT TIME PERIOD SETTING TABLE

| INPUT VALUE | SETTING VALUE |
|---|---|
| LESS THAN 100 nm | 11 |
| 100 nm OR MORE AND LESS THAN 1 μm | 14 |
| 1 μm OR MORE | 17 |

PARTICLE SIZE MEASUREMENT METHOD, PARTICLE SIZE MEASUREMENT APPARATUS, AND PARTICLE SIZE MEASUREMENT PROGRAM

INCORPORATION BY REFERENCE

The present disclosure contains subject matter related to that disclosed in Japanese Priority Patent Application JP 2020-68347 filed in the Japan Patent Office on Apr. 6, 2020, the entire contents of which are hereby incorporated by reference.

BACKGROUND OF THE INVENTION

1. Field of the Invention

The present invention relates to a particle size measurement method, a particle size measurement apparatus, and a particle size measurement program.

2. Description of the Related Art

A dynamic light scattering method has been known as a method of measuring the size of colloidal particles (hereinafter simply referred to as "particles") present in a solution. The dynamic light scattering method is a method of radiating light to particles that are present in a solution and undergoing Brownian motion, to thereby calculate a particle size based on variations in scattered light (see Japanese Patent Application Laid-open No. 2002-296118). Further, there is also known an apparatus configured to measure a particle size distribution representing a relationship between a particle size and frequency of each particle based on an image picked up by an image pickup element (see Japanese Patent Application Laid-open No. 2001-74642).

SUMMARY OF THE INVENTION

In the dynamic light scattering method, a required measurement time period is different depending on the size or diameter of the particles. As in Japanese Patent Application Laid-open No. 2002-296118, in a case in which the measurement time period is fixed, when a sample having a small particle size is set as a measurement target, the measurement time period includes a needless time period, and hence the measurement time period becomes unnecessarily longer. Further, as in Japanese Patent Application Laid-open No. 2001-74642, when the image pickup element is used to measure the particle size, for example, a small particle size of 100 nm or less cannot be measured. The present disclosure has been made in view of the above-mentioned circumstances, and has an object to provide a particle size measurement method, a particle size measurement apparatus, and a particle size measurement program in which a needless measurement time period is omitted by setting an appropriate measurement time period in accordance with a particle size to be measured.

In order to solve the above-mentioned problems, according to at least one embodiment of the present disclosure, there is provided a particle size measurement method including: a test measurement step of irradiating a sample with light during a test measurement time period including a plurality of measurement timings set in advance, to thereby measure a test measurement intensity of scattered light scattered by the sample; an autocorrelation function calculation step of calculating an autocorrelation function representing a relationship between an autocorrelation of the test measurement intensity and time; a setting step of setting a part of the plurality of measurement timings set in advance as measurement timings to be used for main measurement, based on a time period required until the autocorrelation function falls below a predetermined threshold value and a preliminary time period set and added to the time period; a main measurement step of irradiating the sample with light during a main measurement time period including the part of the plurality of measurement timings, to thereby measure a main measurement intensity of the scattered light scattered by the sample; and a particle size calculation step of calculating a particle size of the sample based on the main measurement intensity.

In order to solve the above-mentioned problems, according to at least one embodiment of the present disclosure, there is provided a particle size measurement apparatus including: a test measurement unit configured to irradiate a sample with light during a test measurement time period including a plurality of measurement timings set in advance, to thereby measure a test measurement intensity of scattered light scattered by the sample; an autocorrelation function calculation unit configured to calculate an autocorrelation function representing a relationship between an autocorrelation of the test measurement intensity and time; a setting unit configured to set a part of the plurality of measurement timings set in advance as measurement timings to be used for main measurement, based on a time period required until the autocorrelation function falls below a predetermined threshold value and a preliminary time period set and added to the time period; a main measurement unit configured to irradiate the sample with light during a main measurement time period including the part of the plurality of measurement timings, to thereby measure a main measurement intensity of the scattered light scattered by the sample; and a particle size calculation unit configured to calculate a particle size of the sample based on the main measurement intensity.

In order to solve the above-mentioned problems, according to at least one embodiment of the present disclosure, there is provided a particle size measurement program for causing a computer, which is used in a particle size measurement apparatus configured to measure a particle size of a sample, to execute: a test measurement step of irradiating the sample with light during a test measurement time period including a plurality of measurement timings set in advance, to thereby measure a test measurement intensity of scattered light scattered by the sample; an autocorrelation function calculation step of calculating an autocorrelation function representing a relationship between an autocorrelation of the test measurement intensity and time; a setting step of setting a part of the plurality of measurement timings set in advance as measurement timings to be used for main measurement, based on a time period required until the autocorrelation function falls below a predetermined threshold value and a preliminary time period set and added to the time period; a main measurement step of irradiating the sample with light during a main measurement time period including the part of the plurality of measurement timings, to thereby measure a main measurement intensity of the scattered light scattered by the sample; and a particle size calculation step of calculating the particle size of the sample based on the main measurement intensity.

DESCRIPTION OF THE EMBODIMENTS

At least one embodiment of the present disclosure is described below with reference to the drawings.

Figure 1:
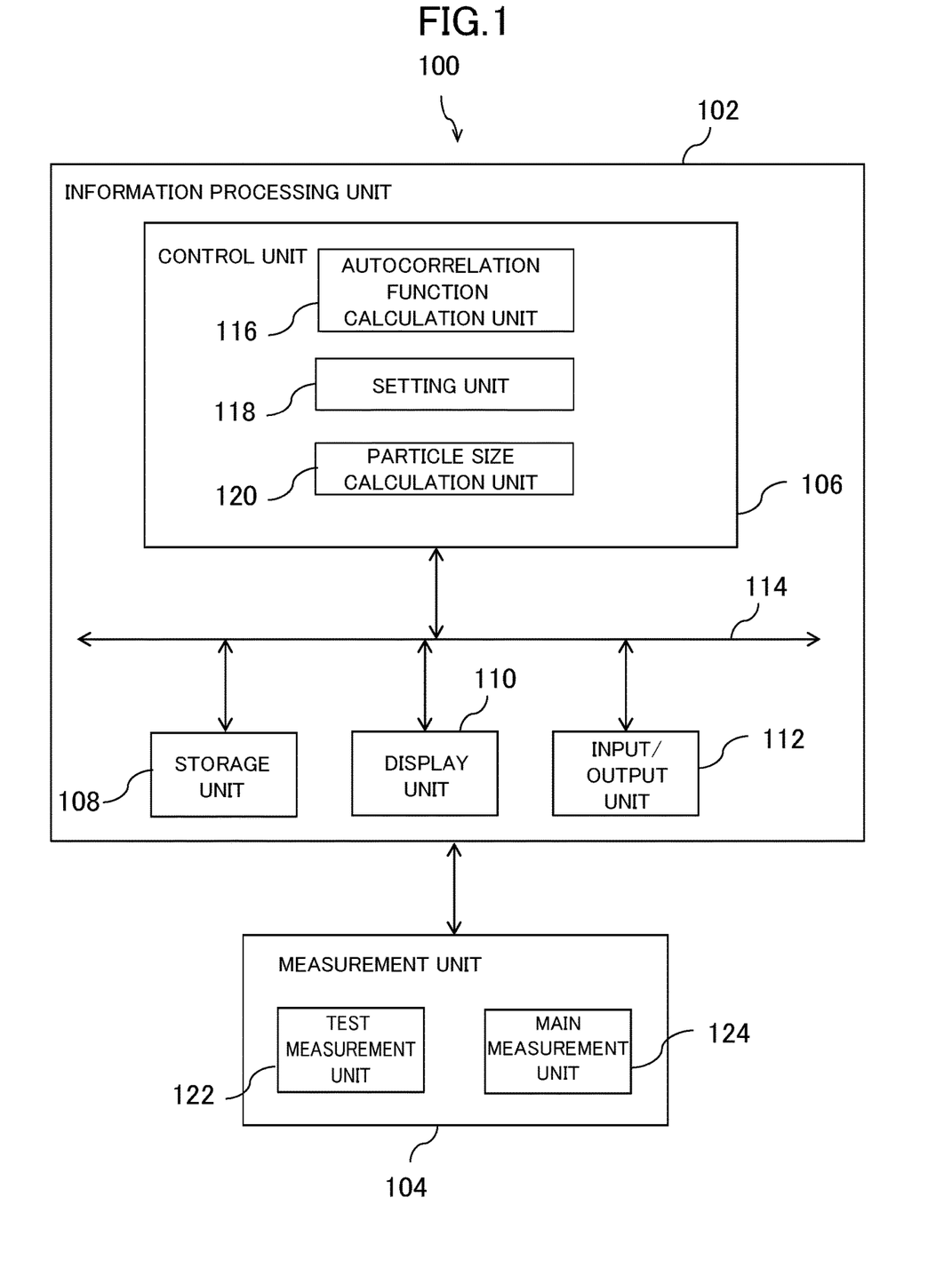
FIG. 1 is a schematic diagram for illustrating an outline configuration of a particle size measurement apparatus according to at least one embodiment of the present disclosure.

FIG. 1 is a schematic diagram for illustrating an outline configuration of a particle size measurement apparatus 100 according to the at least one embodiment. As illustrated in FIG. 1, the particle size measurement apparatus 100 according to the at least one embodiment includes an information processing unit 102 and a measurement unit 104. The information processing unit 102 includes a control unit 106, a storage unit 108, a display unit 110, and an input/output unit 112. The information processing unit 102 is, for example, a general computer. The control unit 106, the storage unit 108, the display unit 110, and the input/output unit 112 are connected to each other by a data bus 114 so that mutual exchange of electrical signals is allowed.

The control unit 106 is a central processing unit (CPU) being a processor. Specifically, the control unit 106 functionally includes an autocorrelation function calculation unit 116, a setting unit 118, and a particle size calculation unit 120. Each of the units is configured to operate as described later in accordance with a program stored in the storage unit 108.

The storage unit 108 is a main storage, for example, a random access memory (RAM), and an auxiliary storage such as a hard disk drive (HDD) or solid state drive (SSD), which is capable of statically recording information. The storage unit 108 stores, in addition to a particle size measurement program, programs for controlling the operations of the units included in the information processing unit 102. Further, the storage unit 108 stores in advance tables to be described later.

The display unit 110 is, for example, a cathode ray tube (CRT) or a so-called flat panel display. The display unit 110 is configured to visually display an image for a user.

The input/output unit 112 is one or a plurality of devices for allowing the user to input information, such as a keyboard, a mouse, and a touch panel. The input/output unit 112 is one or a plurality of interfaces for allowing the information processing unit 102 to exchange information with an external device, for example, the measurement unit 104. For example, the input/output unit 112 receives, as input, results of measurement performed by the measurement unit 104. The input/output unit 112 may include various ports for establishing wired connection, and a controller for establishing wireless connection. The configuration of the information processing unit 102 described here is merely an example, and the information processing unit 102 may have other configurations.

Figure 2:
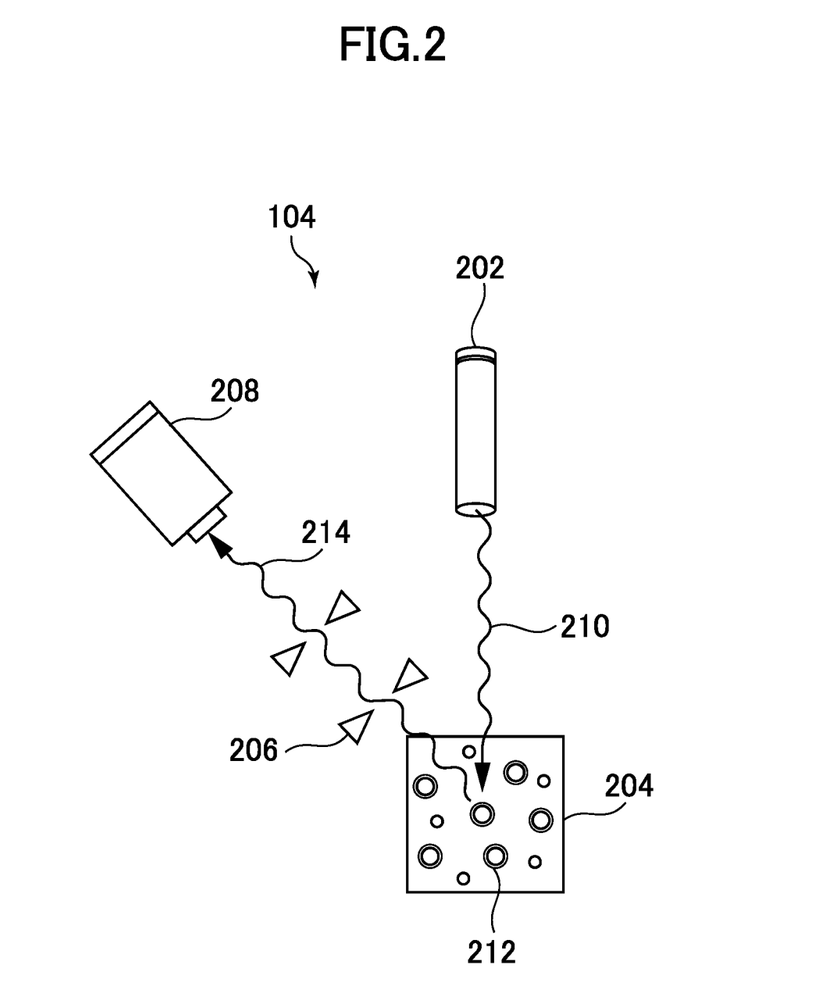
FIG. 2 is a view for illustrating an example of an outline configuration of a measurement unit in the at least one embodiment.

The measurement unit 104 functionally includes a test measurement unit 122 and a main measurement unit 124. The test measurement unit 122 is configured to irradiate a sample with light during a test measurement time period including a plurality of measurement timings set in advance, to thereby measure a test measurement intensity of scattered light 214 (to be described later) scattered by the sample. The main measurement unit 124 is configured to irradiate the sample with light during a main measurement time period including a part of the measurement timings included in the test measurement time period, to thereby measure a main measurement intensity of the scattered light 214 scattered by the sample. Details of the functions of the test measurement unit 122 and the main measurement unit 124 are described later. FIG. 2 is a schematic view for illustrating an outline of a hardware configuration of the measurement unit 104. The hardware configuration of the measurement unit 104 is known, and hence only a simple description thereof is given here.

As illustrated in FIG. 2, the measurement unit 104 includes a light source 202, a sample holder 204, pinholes 206, and a light receiving unit 208. The light source 202 is, for example, a semiconductor laser generating device configured to emit laser light 210 having a predetermined wavelength. On the sample holder 204, a sample serving as a measurement target is arranged. The sample is in a liquid form, and contains particles 212 undergoing Brownian motion. The laser light 210 emitted from the light source 202 is radiated to the particles 212 included in the sample to be scattered. The scattered light 214 enters the light receiving unit 208 via the pinholes 206.

The light receiving unit 208 is configured to count the number of incident photons for a set period of time to measure a time change of the intensity of the scattered light 214. Specifically, the light receiving unit 208 is a multichannel analyzer, and includes a semiconductor detector corresponding to each channel and a counter configured to count the number of photons detected by each semiconductor detector. Each channel of the light receiving unit 208 counts the number of incident photons for a specified period. Thus, the light receiving unit 208 measures the time change of the intensity of the scattered light 214.

Figure 3:
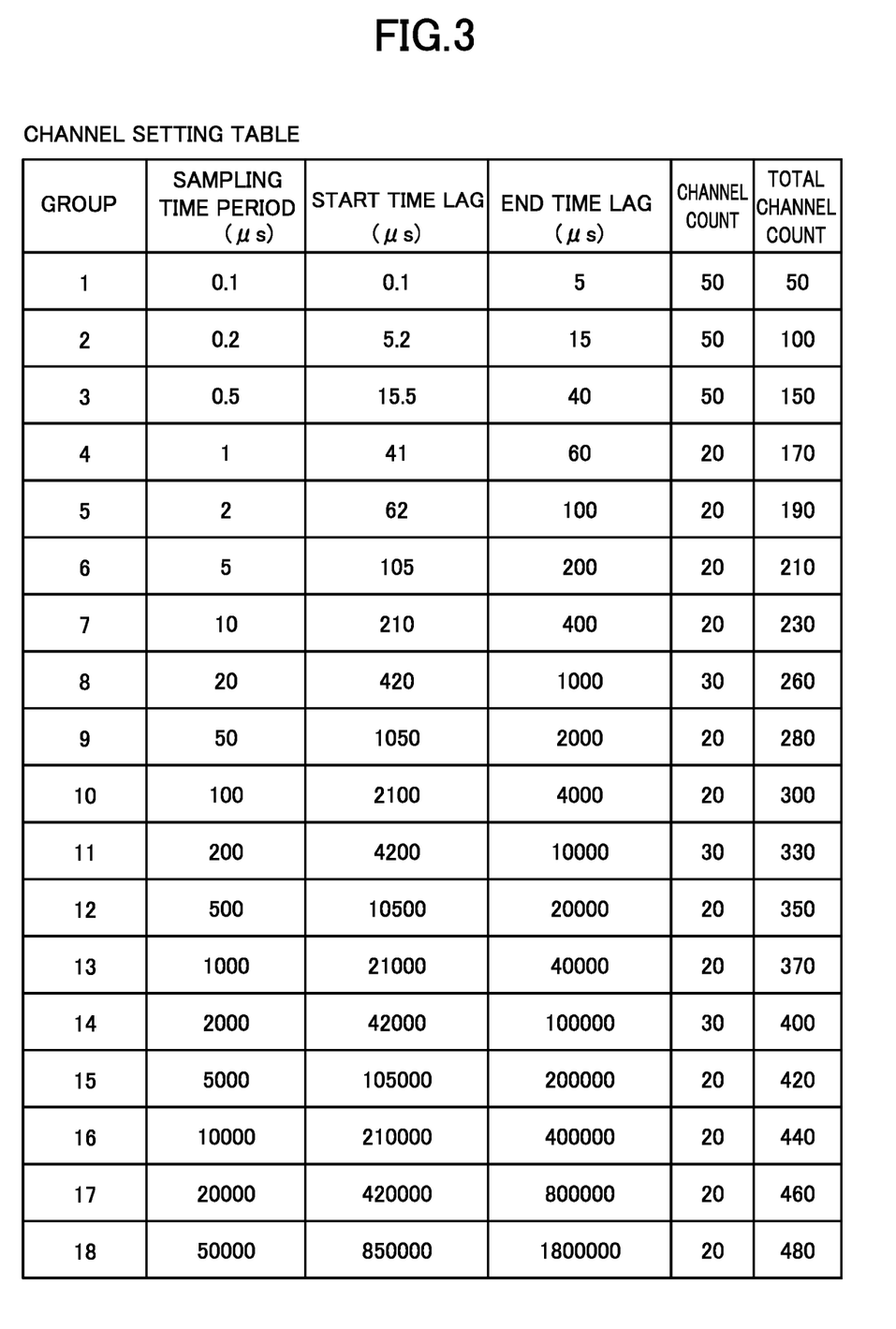
FIG. 3 is a diagram for showing an example of a channel setting table.

In the at least one embodiment, the measurement unit 104 is configured to operate based on a relationship among a sampling time period, a start time lag, an end time lag, the number of channels, and a total number of channels, which are stored in the storage unit 108. Specifically, for example, the storage unit 108 stores a table shown in FIG. 3 representing the relationship among a group, the sampling time period, the start time lag, the end time lag, the number of channels (channel count), and the total number of channels (total channel count). The table shown in FIG. 3 is hereinafter referred to as "channel setting table."

The "group" refers to a number indicating a channel group for which the same sampling time period is set. The "sampling time period" refers to a time period for which each channel counts the number of photons, and the time period is set for each channel. The "start time lag" of each group refers to a time period from a timing at which the measurement is started to an earliest timing among timings at which the channels belonging to a corresponding group end the sampling. The "end time lag" of each group refers to a time period from the timing at which the measurement is started to a latest timing among the timings at which the channels belonging to the corresponding group end the sampling. The "number of channels" represents the number of channels included in each group. The "total number of channels" represents a number obtained by summing up the number of channels included in a corresponding group and all of the numbers of channels included in groups having numbers smaller than that of the corresponding group. When the number of channels belonging to each group and the sampling time period are set, the other items are set to predetermined values corresponding to the number of channels and the sampling time period.

The measurement unit 104 is configured to perform measurement based on an instruction from the control unit 106, through use of channels belonging to groups from group 1 to a set group included in FIG. 3. Specifically, for example, description is given with reference to FIG. 4 of a case in which the measurement unit 104 acquires, from the control unit 106, an instruction to perform measurement through use of channels belonging to groups 1 to 10. In this case, first, the measurement unit 104 counts the number of photons through use of channels in the 50 channels belonging to group 1.

Figure 4:
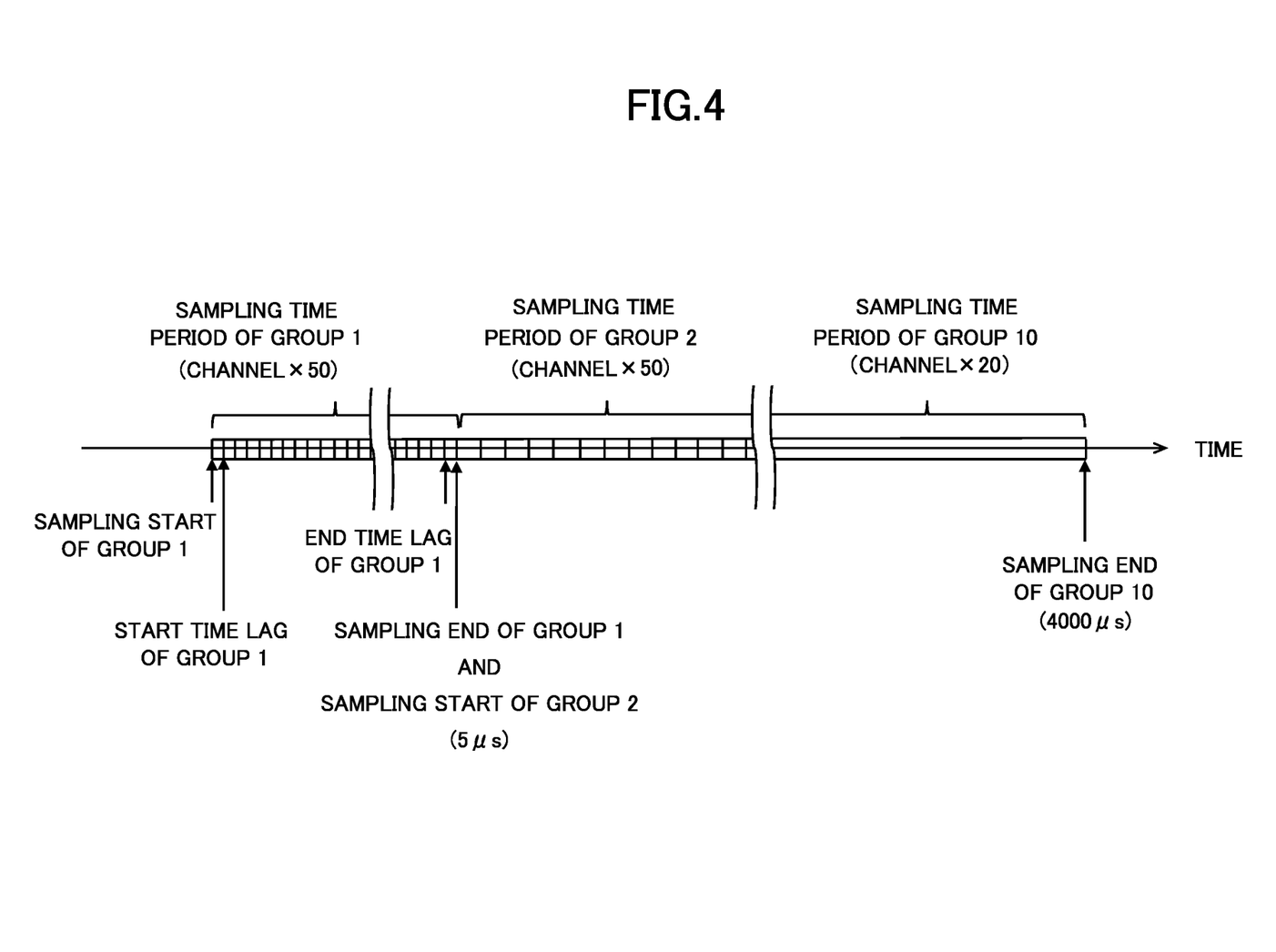
FIG. 4 is a view for illustrating a sampling time period of each channel.

In this case, the channels belonging to group 1 are set to have respective measurement start timings (hereinafter simply referred to as "measurement timings") so that the time periods for sampling are prevented from overlapping each other and are successive. As shown in FIG. 3, the sampling time period of each channel included in group 1 is 0.1 μs, and the start time lag of group 1 is 0.1 μs. The end time lag of group 1 is 5 μs, and the number of channels included in group 1 is 50. Consequently, as illustrated in FIG. 4, the channels included in group 1 sequentially count the number of photons for a period of 5 μs from a timing at which the measurement unit 104 starts the measurement in accordance with the instruction from the control unit 106 to start the measurement.

Then, after the sampling time period of a channel having the latest measurement timing in group 1 is ended, channels belonging to group 2 start sampling so that the time periods for sampling are prevented from overlapping each other and are successive. Similarly to group 1, the channels belonging to group 2 sequentially count the number of photons for a period of 10 μs so that the time periods for sampling are prevented from overlapping each other and are successive.

Similarly, the channels included in each of groups 3 to 10 sequentially count the number of photons. As a result, the measurement unit 104 performs measurement for a period of 4,000 μs corresponding to the end time lag of group 10 of FIG. 3, through use of the channels included in groups 1 to 10. The result of measurement performed by the measurement unit 104 is represented by a relationship between an intensity (counted number of photons, unit: cps) and time.

Figure 5:
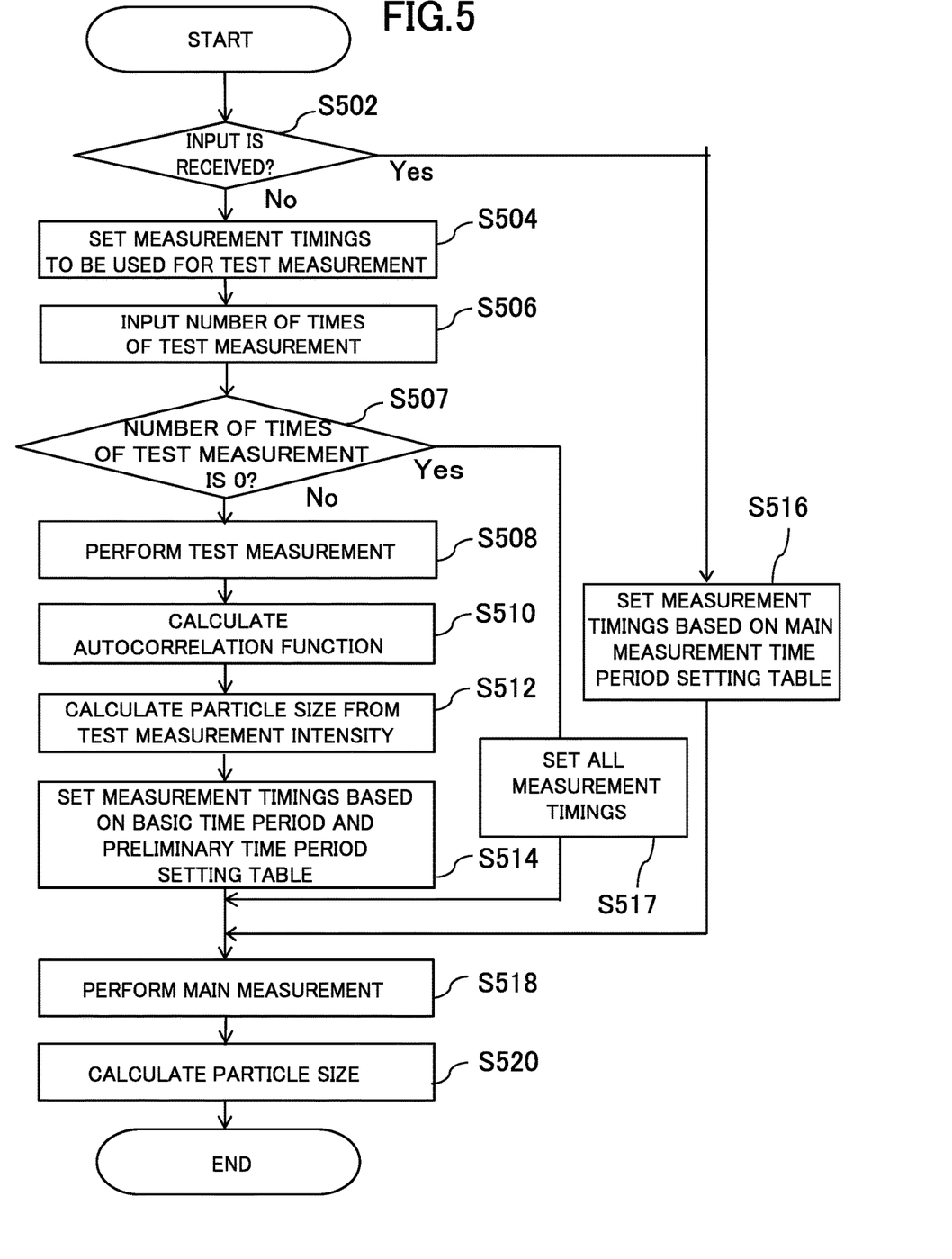
FIG. 5 is a flow chart for illustrating a method of calculating a particle size in the at least one embodiment.

Next, with reference to the flow chart of FIG. 5, description is given of a particle size measurement method according to the at least one embodiment and the functions of the respective units included in the control unit 106. First, it is determined whether or not a user has input the value of the particle size of the particles 212 included in the sample (Step S502).

When, in Step S502, the value of the particle size is not input, the setting unit 118 sets measurement timings to be used for test measurement based on the relationship between the particle size and the measurement timing set in advance (Step S504). Specifically, for example, the setting unit 118 sets all measurement timings shown in FIG. 3, which are stored in the storage unit 108 in advance. In this case, the test measurement time period including all of the measurement timings is 1,800,000 μs. The setting is performed by the control unit 106 transmitting, to the measurement unit 104, the instruction to perform measurement through use of all of the channels belonging to groups 1 to 18.

Next, the input/output unit 112 receives the input of the number of times of test measurement (Step S506). Specifically, for example, the user operates the input/output unit 112 so that the input/output unit 112 receives the number of times of test measurement as 5 times. The number of times of test measurement to be input is desired to be smaller than the number of times of measurement performed to calculate the particle size in the related art. As described later, with the number of times of test measurement being reduced, the entire measurement time period can be reduced.

Next, when the number of times of test measurement input in Step S506 is other than 0, the processing proceeds to Step S508, and when the input number of times of test measurement is 0, the processing proceeds to Step S517 (Step S507). When the input number of times of test measurement is other than 0, the test measurement unit 122 irradiates the sample with light during a set test measurement time period, to thereby measure a test measurement intensity of the scattered light 214 scattered by the sample (Step S508). Specifically, the test measurement unit 122 counts the number of photons sequentially entering the detectors corresponding to channels 1 to 480, to thereby measure a time-dependent intensity of the scattered light 214 for the period of 1,800,000 μs. Further, the test measurement unit 122 performs the corresponding measurement 5 times input in Step S506. It is preferred to perform the measurement of the test measurement intensity a plurality of times for the test measurement step of Step S508, but the measurement may be performed one time.

Next, the autocorrelation function calculation unit 116 calculates an autocorrelation function representing a relationship between an autocorrelation of the test measurement intensity and time. Specifically, for example, when the test measurement intensity is set as I(t), the autocorrelation function calculation unit 116 calculates an autocorrelation function G2(τ) through use of Expression 1.

$$G2(\tau) = \frac{\langle I(t) \times I(t+\tau) \rangle}{\langle I(t) \rangle^2} \quad \text{[Expression 1]}$$

Figure 6:
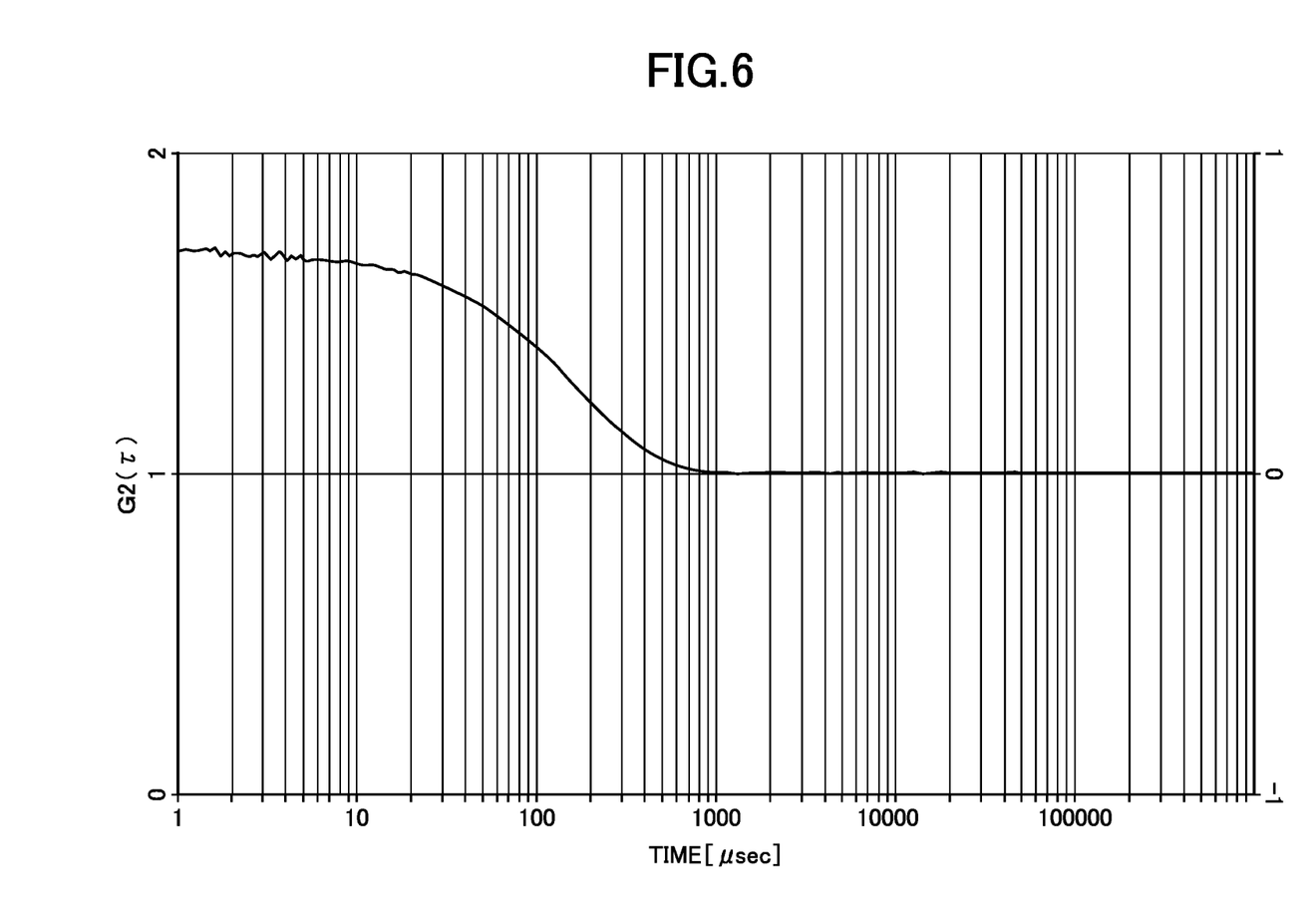
FIG. 6 is a graph for showing an example of an autocorrelation function.

For example, FIG. 6 is a graph for showing an example of the autocorrelation function calculated by the autocorrelation function calculation unit 116 based on the test measurement intensity. As shown in FIG. 6, the autocorrelation function takes a maximum value when the measurement time period is 0, and is gradually damped to converge to 1 at a time corresponding to the particle size.

Next, the particle size calculation unit 120 calculates the particle size of the sample based on the test measurement intensity (Step S512). Specifically, the particle size calculation unit 120 calculates a diffusion coefficient based on the autocorrelation function calculated in Step S510. Further, the particle size calculation unit 120 calculates the particle size that is based on the test measurement intensity based on the diffusion coefficient and the Stokes-Einstein equation. When the test measurement intensity is measured a plurality of times, the particle size calculation unit 120 may calculate an average value of the particle sizes calculated for every test measurement intensity, or the maximum value thereof may be calculated.

Next, the setting unit 118 sets a part of the plurality of measurement timings set in advance as measurement timings to be used for main measurement, based on a time period required until the autocorrelation function falls below a predetermined threshold value and a preliminary time period set and added to the time period (Step S514).

Figure 7:
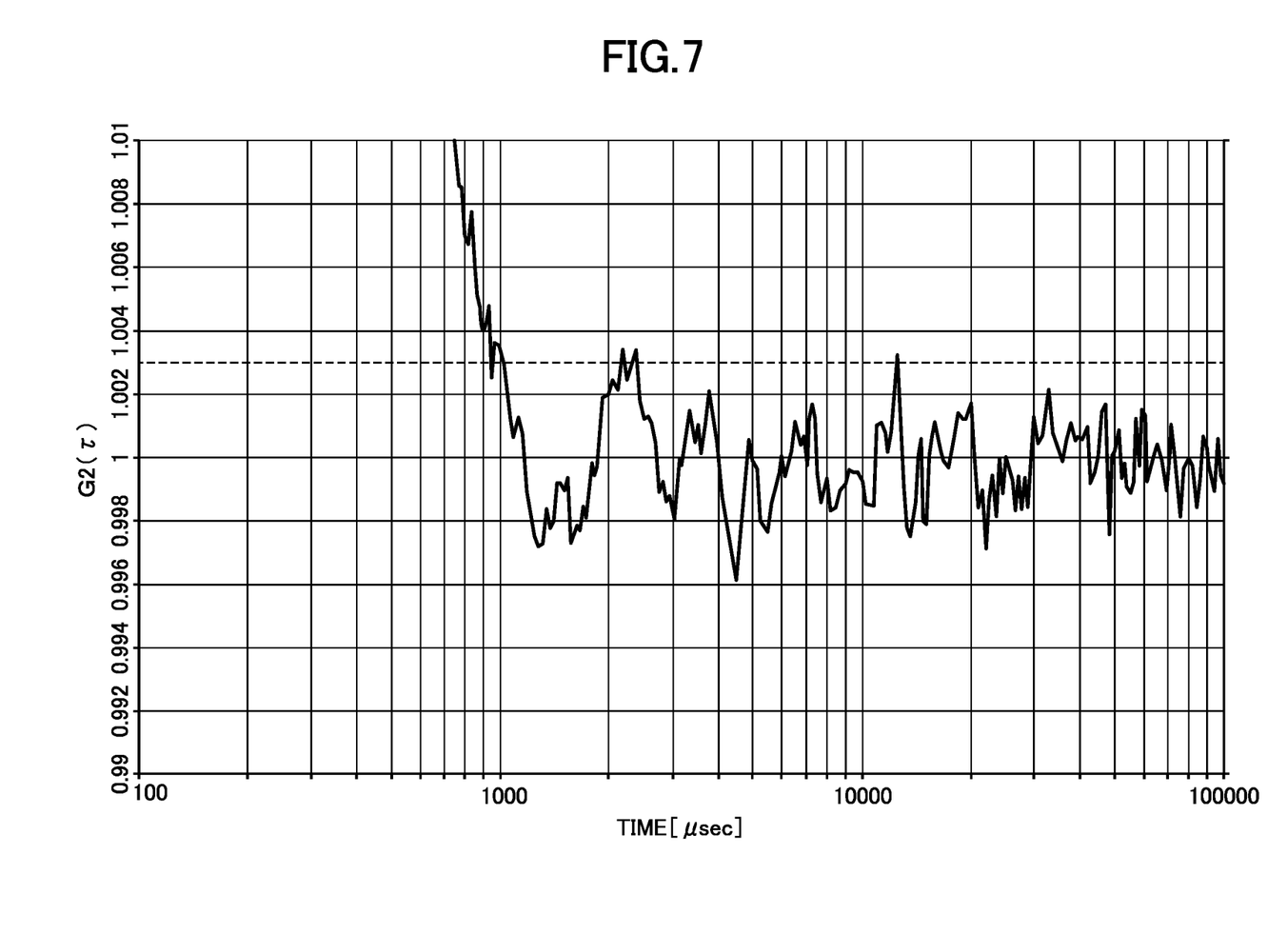
FIG. 7 is a graph for showing an example of the autocorrelation function.

Specifically, first, the setting unit 118 sets a basic time period based on the time period required until the autocorrelation function falls below the predetermined threshold value. For example, FIG. 7 is an enlarged graph of the vicinity of the time at which the autocorrelation function of FIG. 6 converges to 1. As shown in FIG. 7, the autocorrelation function falls below a threshold value of 1.003 at the time of 1,000 µs, and hence the setting unit 118 sets the basic time period as 1,000 µs. Then, the setting unit 118 sets a group corresponding to the basic time period. For example, the setting unit 118 refers to a setting table to set, as the group corresponding to the basic time period, group 8 which is a group including the basic time period of 1,000 µs and having the smallest total number of channels.

As described above, the input number of times of test measurement is smaller than the number of times of measurement performed to calculate the particle size in the related art. For that reason, the particle size calculated from the test measurement intensity in Step S512 is a low accuracy value as the particle size of the sample. However, the particle size calculated from the test measurement intensity in Step S512 has a sufficient accuracy as a value to be used for setting the basic time period.

Further, the setting unit 118 sets the preliminary time period based on the number of times of test measurement, the particle size calculated from the test measurement intensity, and the test measurement intensity. Specifically, the setting unit 118 sets a change value of a group corresponding to the preliminary time period.

Figure 8:
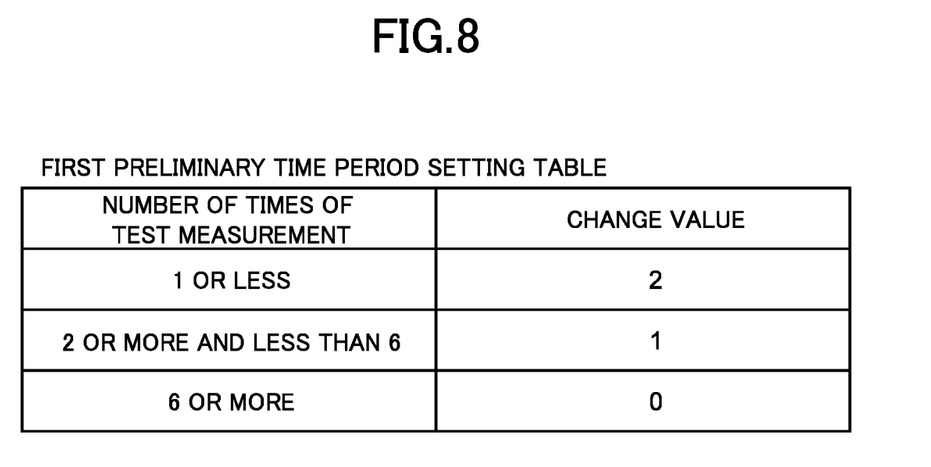
FIG. 8 is a diagram for showing an example of a first preliminary time period setting table.

For example, the setting unit 118 sets the change value so that the preliminary time period becomes longer as the number of times of test measurement becomes smaller. FIG. 8 is a first preliminary time period setting table for showing a relationship between the number of times of test measurement and the change value of the group. As described above, when the number of times of test measurement is 5, the setting unit 118 sets 1 as the change value corresponding to the number of times of test measurement. When the number of times of test measurement is small, the accuracy of the test measurement is low at high possibility. For that reason, the first preliminary time period setting table is used to avoid a situation in which a time period during which the autocorrelation function falls below the threshold value is not included in a main measurement time period even when the number of times of test measurement is small.

Figure 9:
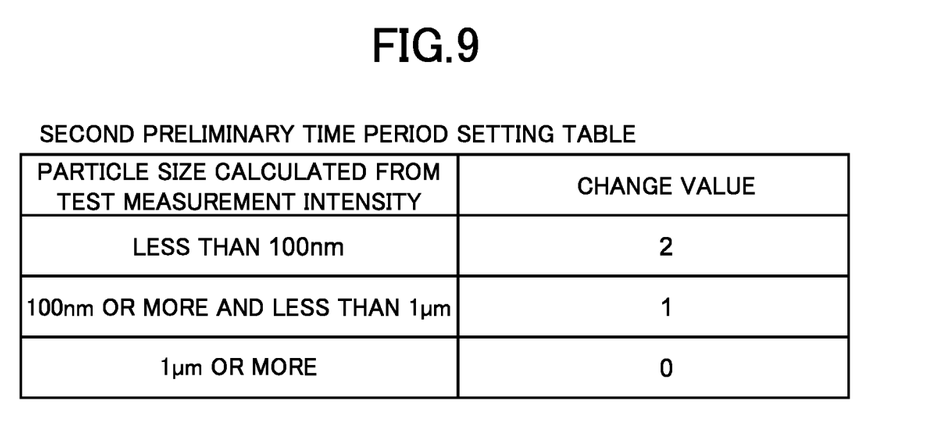
FIG. 9 is a diagram for showing an example of a second preliminary time period setting table.

Further, the setting unit 118 sets the change value so that the preliminary time period becomes longer as the particle size calculated from the test measurement intensity becomes smaller. FIG. 9 is a second preliminary time period setting table for showing a relationship between the particle size calculated from the test measurement intensity and the change value of the group. For example, when the particle size calculated from the test measurement intensity in Step S512 is 2 µm, the setting unit 118 sets 0 as the change value corresponding to the particle size calculated from the test measurement intensity. The main measurement time period can be reduced as the particle size becomes smaller, but when the particle size is small, the basic time period may be set to be excessively short. In this case, the time period during which the autocorrelation function falls below the threshold value may not be included in the main measurement time period depending on the accuracy of the test measurement, but this situation can be avoided through use of the second preliminary time period setting table.

Figure 10:
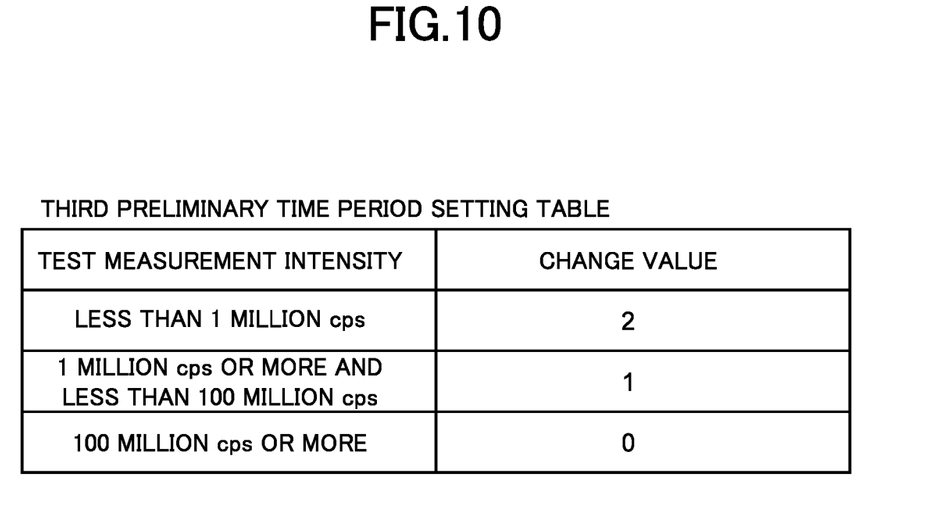
FIG. 10 is a diagram for showing an example of a third preliminary time period setting table.

Further, the setting unit 118 sets the change value so that the preliminary time period becomes longer as the average value of the test measurement intensities becomes smaller. FIG. 10 is a third preliminary time period setting table for showing a relationship between the test measurement intensity and the change value of the group. For example, when the test measurement intensity measured in Step S508 is 5 million cps, the setting unit 118 sets 1 as the change value corresponding to the test measurement intensity. When the test measurement intensity is small, the accuracy of the test measurement is low at high possibility. For that reason, the third preliminary time period setting table is used to avoid a situation in which a time period during which the autocorrelation function falls below the threshold value is not included in a main measurement time period even when the accuracy of test measurement is low.

The setting unit 118 adds a sum of the change values set in the first to third preliminary time period setting tables to the number of the group corresponding to the basic time period. In the above-mentioned example, the setting unit 118 adds 8, which is the number of the group specified as the group corresponding to the basic time period, to 2, which is the sum of the change values, to obtain 10. Then, the setting unit 118 sets, as the measurement timings to be used for main measurement, measurement timings of the respective channels included in groups 1 to 10. In this case, the main measurement time period including the measurement timings is 4,000 µs. The setting of the setting unit 118 is performed by the control unit 106 transmitting, to the measurement unit 104, an instruction to perform measurement through use of all of the channels belonging to groups 1 to 10.

Figure 11:
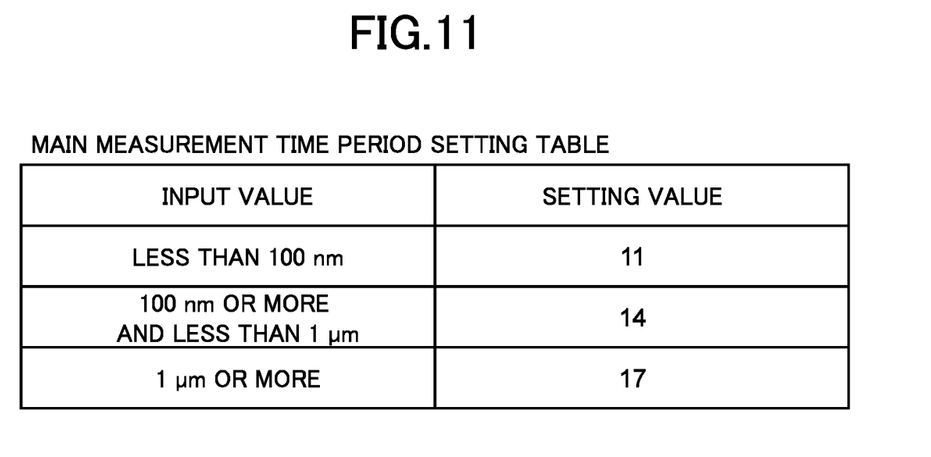
FIG. 11 is a diagram for showing an example of a main measurement time period setting table.

Now, description is given back to a case in which the value of the particle size is input in Step S502. When, in Step S502, the value of the particle size is not input, the setting unit 118 sets measurement timings to be used for main measurement based on the relationship between the particle size and the measurement timing set in advance (Step S516). Specifically, for example, the setting unit 118 refers to a main measurement time period setting table shown in FIG. 11 to set the measurement timings to be used for main measurement. For example, when the value input in Step S502 is 500 nm, the setting unit 118 sets the measurement timings of the respective channels included in groups 1 to 14 as the measurement timings to be used for main measurement. Similarly to Step S514, the setting of the setting unit 118 is performed by the control unit 106 transmitting, to the measurement unit 104, an instruction to perform measurement through use of all of the channels belonging to groups 1 to 14. In this case, the test measurement step itself is not performed. Thus, the measurement time period can be further reduced when an approximate value of the particle size is known in advance.

Further, when it is determined that the number of times of test measurement is 0 in Step S507, the setting unit 118 sets all of the measurement timings as the measurement timings to be used for main measurement (Step S517). Specifically, for example, the setting unit 118 sets all of the measurement timings shown in FIG. 3, which are stored in the storage unit 108 in advance. In this case, the test measurement time period including all of the measurement timings is 1,800,000

μs. The setting by the setting unit 118 is performed by the control unit 106 transmitting, to the measurement unit 104, the instruction to perform measurement through use of all of the channels belonging to groups 1 to 18. In this case, even when the particle size is not input, the main measurement is performed in accordance with the timing at which the number of times of test measurement is input. Consequently, the user can control the timing to start the main measurement.

Next, the main measurement unit 124 irradiates the sample with light during the main measurement time period, to thereby measure a main measurement intensity of the scattered light 214 scattered by the sample (Step S518). Specifically, the main measurement unit 124 performs the main measurement based on the measurement timings set in Step S514, Step S516, or Step S517. As in the above-mentioned example, when the measurement timings of the respective channels included in groups 1 to 10 are set, the main measurement unit 124 counts the number of photons sequentially entering the detectors corresponding to channels 1 to 300, to thereby measure the time-dependent intensity of the scattered light 214 for a period of 4,000 μs.

Further, the main measurement unit 124 performs the main measurement the number of times set in advance as the number of times that allows accurate measurement of the particle size. The number of times of main measurement may be fixed, or may be determined through input of the user via the input/output unit 112, but is set to be larger than the number of times of test measurement.

Next, the particle size calculation unit 120 calculates the particle size of the sample based on the main measurement intensity. Specifically, for example, the particle size calculation unit 120 calculates the particle size of the sample through use of a measurement result obtained in Step S518 by a method similar to that in Step S512. The main measurement intensity is measured a plurality of times, and hence the particle size calculation unit 120 calculates an average value of the particle sizes calculated for every main measurement intensity.

As described above, according to the at least one embodiment, the main measurement time period is set to be shorter than the test measurement time period, thereby being capable of finishing the measurement with a shorter time period without reducing the accuracy of the measurement. For example, in the particle size measurement apparatus 100 requiring measurement of times to obtain a certain measurement accuracy, when the measurement is performed through use of all of the channels included in the above-mentioned channel setting table as in the related art, measurement of 1,800,000 μs is required to be performed 25 times. In this case, the entire measurement time period is about 45 seconds. Meanwhile, as in the above-mentioned at least one embodiment, when the test measurement in which the measurement of 1,800,000 μs is performed is performed 5 times and the main measurement in which the measurement of 4,000 μs is performed is performed 25 times, the entire measurement time period is about 9 seconds. Consequently, the measurement time period can be reduced while the number of autocorrelation functions to be used for calculating the particle size is maintained.

The present invention is not limited to the mode described in the above-mentioned at least one embodiment. For example, the channel setting table shown in FIG. 3 and the preliminary time period setting tables are merely examples, and may be set as appropriate for each particle size measurement apparatus 100. For example, in order to increase the temporal resolution as the measurement time period becomes shorter, the setting table shown in FIG. 3 is set so that the sampling time period becomes longer exponentially as the number of the group becomes larger. However, the sampling time period may be set to become longer in proportion to the number of the group, or the groups may have the same sampling time period.

Further, description has been given of the case in which all of the first preliminary time period setting table to the third preliminary time period setting table are used, but, without using all of the preliminary time period setting tables, only the basic time period may be used to set the main measurement time period, or a part of the preliminary time period setting tables may be used to set the main measurement time period.

Further, in the above, description has been given of the case in which the main measurement time period is set in units of group, but the main measurement time period may be set in units of channel. In this case, the time required for the main measurement time period can be more correctly set, and hence the measurement time period can be further reduced.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A particle size measurement method, comprising:
   a test measurement step of irradiating a sample with light during a test measurement time period including a plurality of measurement timings set in advance, to thereby measure a test measurement intensity of scattered light scattered by the sample;
   an autocorrelation function calculation step of calculating an autocorrelation function representing a relationship between an autocorrelation of the test measurement intensity and time;
   a setting step of setting a part of the plurality of measurement timings set in advance as measurement timings to be used for main measurement, based on a time period required until the autocorrelation function falls below a predetermined threshold value and a preliminary time period set and added to the time period;
   a main measurement step of irradiating the sample with light during a main measurement time period including the part of the plurality of measurement timings, to thereby measure a main measurement intensity of the scattered light scattered by the sample; and
   a particle size calculation step of calculating a particle size of the sample based on the main measurement intensity.

2. The particle size measurement method according to claim 1,
   wherein, in the test measurement step, the measurement of the test measurement intensity is performed a plurality of times, and
   wherein the preliminary time period is set to become longer as the number of times of test measurement becomes smaller.

3. The particle size measurement method according to claim 1,
   wherein, in the test measurement step, the measurement of the test measurement intensity is performed a plurality of times, and wherein the preliminary time period is set to become longer as an average value of the test measurement intensities becomes smaller.

4. The particle size measurement method according to claim 1, further comprising a step of calculating a particle size of the sample based on the test measurement intensity, wherein the preliminary time period is set to become longer as the particle size calculated from the test measurement intensity becomes smaller.

5. A particle size measurement apparatus, comprising:
a measurement unit comprising a light source, a sample holder, pin holes, and a light receiving unit, wherein the measurement unit is configured to:
irradiate a sample with light during a test measurement time period including a plurality of measurement timings set in advance, to thereby measure a test measurement intensity of scattered light scattered by the sample;
a central processing unit configured to:
calculate an autocorrelation function representing a relationship between an autocorrelation of the test measurement intensity and time;
set a part of the plurality of measurement timings set in advance as measurement timings to be used for main measurement, based on a time period required until the autocorrelation function falls below a predetermined threshold value and a preliminary time period set and added to the time period;
wherein the measurement unit is further configured to irradiate the sample with light during a main measurement time period including the part of the plurality of measurement timings, to thereby measure a main measurement intensity of the scattered light scattered by the sample; and
the central processing unit is further configured to calculate a particle size of the sample based on the main measurement intensity.

6. A particle size measurement program for causing a computer, which is used in a particle size measurement apparatus configured to measure a particle size of a sample, to execute:
a test measurement step of irradiating the sample with light during a test measurement time period including a plurality of measurement timings set in advance, to thereby measure a test measurement intensity of scattered light scattered by the sample;
an autocorrelation function calculation step of calculating an autocorrelation function representing a relationship between an autocorrelation of the test measurement intensity and time;
a setting step of setting a part of the plurality of measurement timings set in advance as measurement timings to be used for main measurement, based on a time period required until the autocorrelation function falls below a predetermined threshold value and a preliminary time period set and added to the time period;
a main measurement step of irradiating the sample with light during a main measurement time period including the part of the plurality of measurement timings, to thereby measure a main measurement intensity of the scattered light scattered by the sample; and
a particle size calculation step of calculating the particle size of the sample based on the main measurement intensity.

* * * * *